Jan. 4, 1938.  C. J. ROHDE ET AL  2,104,332
ROTATABLE DISPENSING AND MEASURING DEVICE
Original Filed Jan. 23, 1935   2 Sheets-Sheet 1
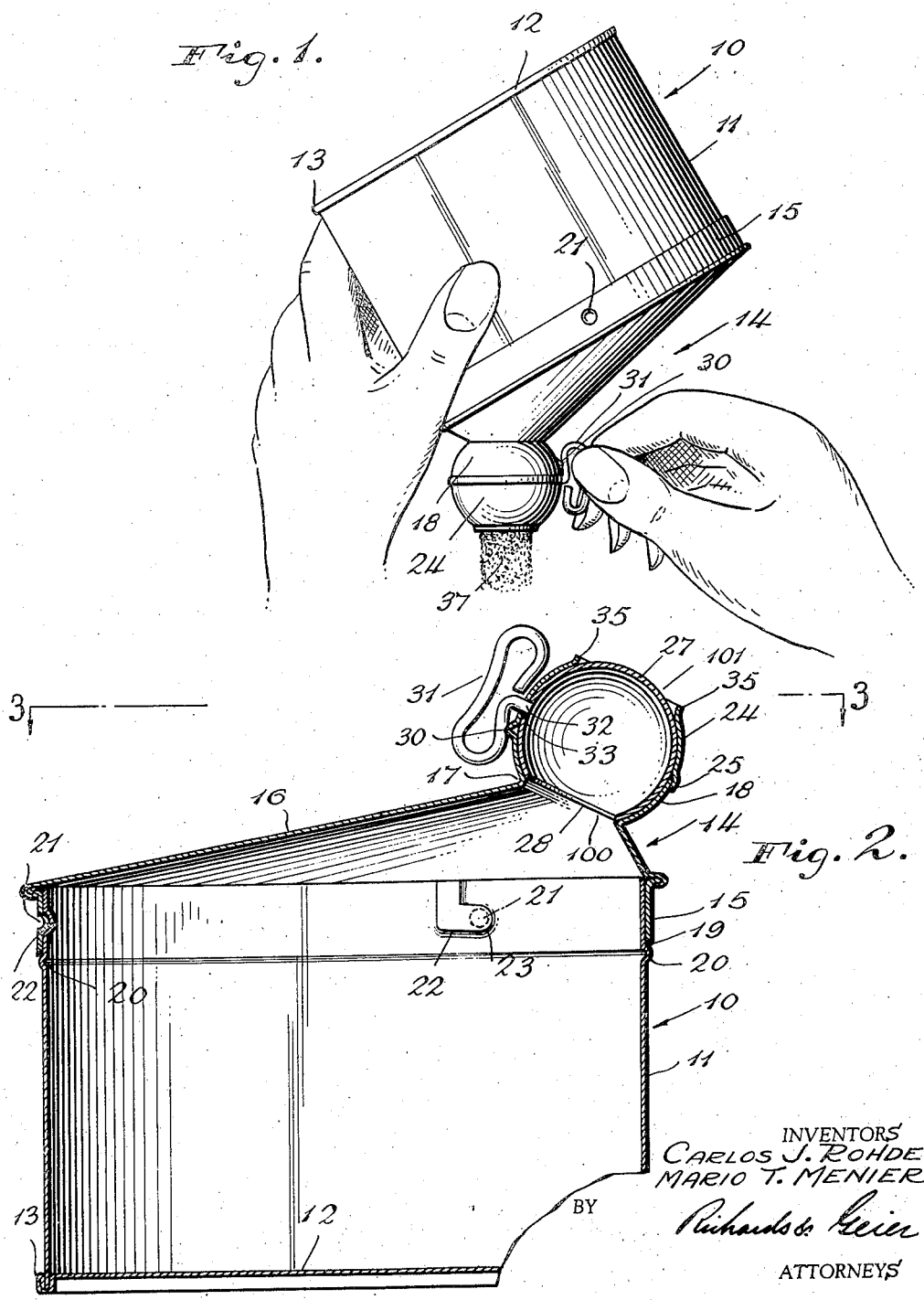
INVENTORS
CARLOS J. ROHDE
MARIO T. MENIER
BY Richards & Geier
ATTORNEYS

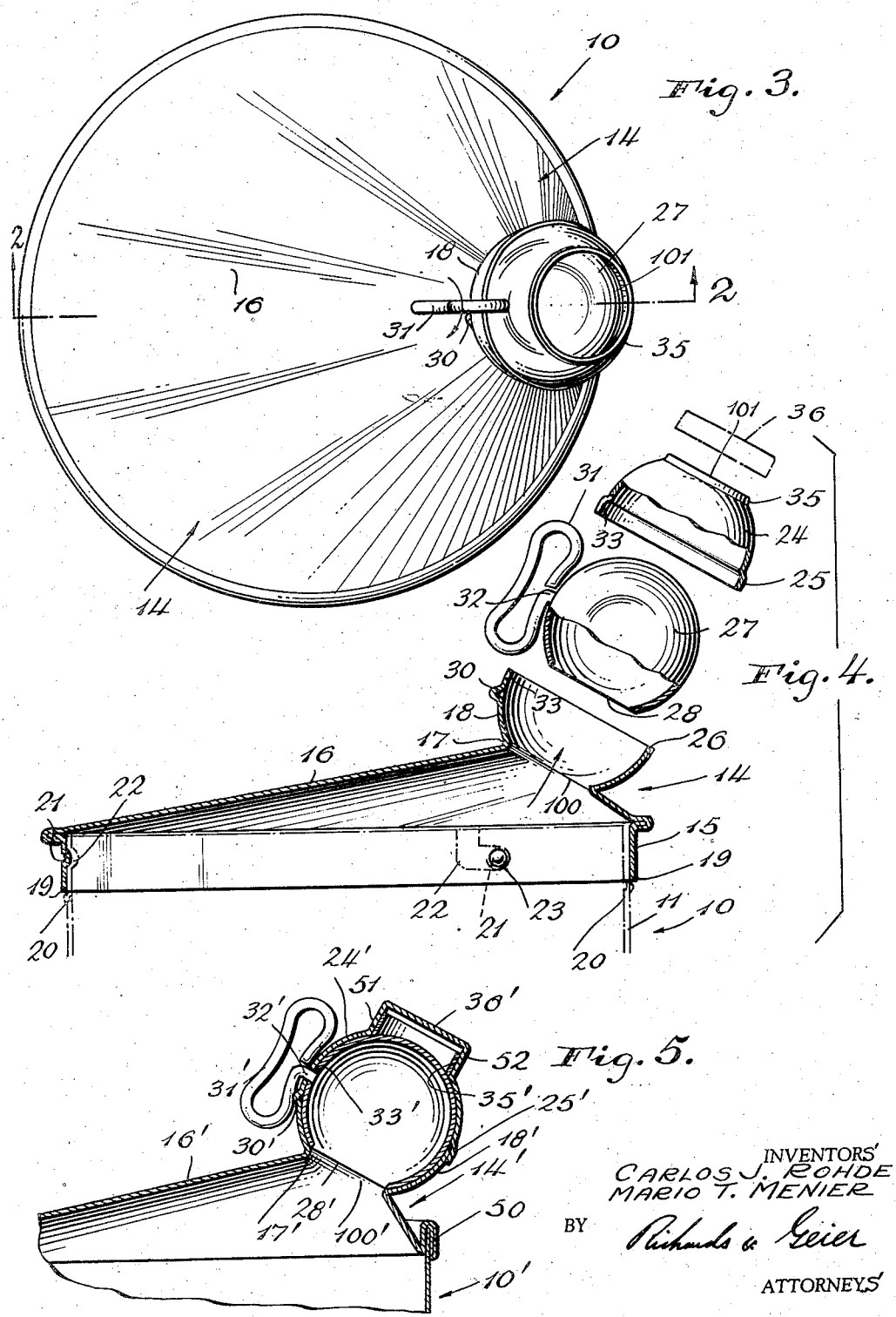

Patented Jan. 4, 1938

2,104,332

UNITED STATES PATENT OFFICE 2,104,332

ROTATABLE DISPENSING AND MEASURING DEVICE

Carlos J. Rohde and Mario T. Menier, New York, N. Y., assignors of one-half to Rose C. Rohde, New York, N. Y., and one-half to said Menier Application January 23, 1935, Serial No. 3,071
Renewed May 12, 1937

6 Claims. (Cl. 221—106)

The present invention relates to a dispensing device for granulated and divided materials and it particularly relates to a dispensing lid, cover or container for household or domestic use.

Although the invention has many applications, it is particularly adapted to be used for the packing and dispensing of coffee and other materials which are desirably packaged in a vacuum or an inert atmosphere.

Among the objects of the present invention are to provide a light-weight, compact dispensing container or a readily detachable and attachable dispensing cover or lid for a container of relatively simple construction and inexpensive manufacture, which may be readily utilized for dispensing granulated, pulverized or divided materials of the character above described, particularly in the household, and which will maintain a desired atmosphere in said container and prevent entrance of the air thereinto when the material is being dispensed.

Another object is to provide a dispensing container or a readily attachable and detachable cover or lid for a container for materials of the character above described, which will protect the contents of such container from air and humidity and at the same time by relatively simple manipulation permit the dispensation of the measured charges of the material from said container.

Other objects will appear during the course of the following specification.

The preferred dispensing device of the present invention preferably is provided with a measuring and dispensing chamber which may be alternately opened to the interior of the container to receive a charge of powdered, granulated or divided material therefrom, and which then may be actuated so as to be cut off from the interior of the container and to permit the dispensation of its contents.

In one preferred embodiment it has been found most satisfactory to provide a peaked cover or lid of oblique frustro-pyramidal or frustro-conical form and to place a globular or spherical enclosure at the peak thereof, which globular cylindrical enclosure is preferably provided with an interior rotatable measuring chamber element.

The enclosure is provided with one opening into the interior of the cover and with another spaced from which the material to be dispensed may be removed.

The measuring chamber may be spherical or globular and conformed closely to the enclosure and provided with a pivotal mount on said enclosure, so that it may be rotated within said enclosure. The close conformation between the enclosure and rotating element will prevent substantial leakage of atmospheric oxygen or humidity into the interior of the container during dispensation.

The rotating chamber is preferably provided with a single opening which may be caused to register alternately with filling opening and with the discharging opening of the enclosure by manual actuating means, preferably taking the form of a key, the bearing of the stem of which in the enclosure forms the pivot mount.

The above and other objects will appear more clearly when taken in connection with the accompanying drawings which illustrate a preferred embodiment of the inventive idea.

In the drawings:

Figure 1 is an inverted elevational view of the dispensing cover or lid device of the present invention attached to a container in dispensing position indicating the manipulation thereof during the dispensing operation.

Figure 2 is a side sectional view of the dispensing lid or cover attached to a container upon an enlarged scale as compared to Fig. 1 upon the line 2—2 of Fig. 3.

Figure 3 is a top view of said dispensing cover or lid upon the line 3—3 of Fig. 2 and upon the same scale as Fig. 2.

Figure 4 is an exploded side view in partial section of the dispensing arrangement illustrating the assembly of various constituent elements.

Figure 5 is a fragmentary side sectional view of another embodiment in which the dispensing device is formed as a permanent element of the container.

Referring to Figs. 1 to 4, a standard type of cylindrical can or container 10 is shown with cylindrical side walls 11, and a bottom wall 12 connected thereto, as by the flanged connection 13.

As shown in Figs. 1 to 4 the standard cover of the container has been removed and the dispensing cover or lid 14 to which the present invention is particularly directed has been attached.

The dispensing cover or lid 14 has a downwardly depending cylindrical side flange, skirt or collar 15 and an oblique frustro-conical portion 16, which is truncated at 17 and receives the hemispherical enclosure or shell 18. The skirt portion 15 is adapted to be telescoped onto the top of the container 10 and at its lower edge 19 is stopped by the ridge 20 upon the side wall 11.

The flange, skirt or collar 15 is provided with a series of nipples, tits or projections 21, which are designed to be received in the L-shaped locking grooves 22, the lower legs 23 of which may be inclined slightly downwardly so that the dispensing cover 14 will be firmly clamped on the top of the can 10.

The hemispherical enclosure or shell 18 is adapted to be attached to the upper hemispherical enclosure or shell 24. The shell 24 is provided at its lower end with a flange 25, which is telescoped around the edge 26 of the shell 18 (see Fig. 4).

These two shells 18 and 24 form the spherical enclosure of the dispensing device 14, which enclosure is provided with the charging opening 100 from the interior of the cover 14 and the discharging opening 101.

Positioned between and closely conforming to the interior of the enclosure formed by upper hemispherical element 24 and said lower hemispherical element 18 is the rotatable hollow ball member 27 serving as a measuring compartment.

The ball is provided with an opening 28 at one side which is of the same dimension as the charging and discharging openings 100 and 101 in the enclosure 18—24 and may be alternately registered therewith.

Rigidly connected to the spherical shell or bell 27 is a key 31, the stem 32 of which bears in an opening 33 in the enclosure shell 18—24, and serves as a pivot mount for the interior shell 24.

The upper shell 24 is provided with a mouth 35 around the discharging opening 101. The cover 36 may be placed upon said mouth if desired.

The operation of the device is readily apparent. When the householder receives the can of divided material from the store she will remove the standard cover and apply the dispensing cover or lid which she may have previously purchased or which may have been distributed by the packer of the coffee or other material for advertising purposes.

The dispensing cover or lid will preferably have connecting means to fit the cooperating connecting means on the can or container. In the present showing the slots 22 and the nipples 21 are merely illustrative of one type of connection. The dispensing cover 14 thereby may be connected to the can or container in an air-tight manner.

Then to dispense the coffee or other divided material, the can or container may be turned to the position of Fig. 1 with the inner or measuring element 27 in the position as shown in Fig. 2 with its mouth 28 registering with the opening 100 to the interior of the container so that it may fill with the granulated material to be dispensed.

Then by rotation of the key 31 the hollow metering element 27 may be rotated until its mouth 28 coincides with the discharging opening 101 of the outer shell 18—24, whereupon as indicated at 37 in Fig. 1, the contents thereof may be readily dumped into a cup, pot or other container.

The rotation of the key 31 is preferably limited by the stop 39 to assure registration of the mouth 28 with the charging and discharging openings 100 and 101.

In Fig. 5 is shown another arrangement in which the dispensing cover or lid may be permanently attached to the can by the packer or manufacturer and thus sold to jobbers, retailers and consumers.

In Fig. 5 similarly functioning parts to those indicated in Figs. 1 to 4 will be indicated by the same numerals primed.

It will be noted that the connection 50 between the dispensing cover 14' and the can 10' does not permit of ready detachment.

In this embodiment the auxiliary cover element 36' is preferably connected to the mouth 35' by a rip band 51, which may be readily removed when the material is to be consumed. The residual side flange 52 of the cover 36' will be sufficient to telescope over the flange 35' to function as the cover 36 of Fig. 4.

The hollow spheres 18—24 and 27 are preferably caused to be so closely fitted together and adjusted as to eliminate the possibility of leakage of air to the container.

The truncated pyramidal or conical element 16 of the cover or lid 14 may be stiffened or reinforced by providing ridges or depressions therein if desired.

It will be noted that the improved dispensing container cover or lid of the present invention assures enhanced preservation of the quality of the foodstuff by substantially eliminating the atmosphere while the foodstuff is being dispensed.

The cover or lid device, when applied as in Fig. 5, makes the container a non-refillable device.

The spherical device 18—24 may be made of convenient size, or may be replaced by other dispensing devices of different shapes and construction. The size may be varied to dispense from one-half teaspoon up to a heaping tablespoon.

It is also to be understood that the dispensing cover of the present invention may be applied to other containers than shown, such as glass jars or receptacles and it also may be conveniently connected to devices other than cylindrical devices, such as prismatic containers and so forth.

What is claimed is:

1. A dispensing cover or lid device provided with a skirt portion to be telescopically received on the top of a container for granular powdered or divided materials, and also being provided with a rotatable measuring device comprising closely fitting inner and outer spherical shells and adapted to be filled from the interior of the can and also to be turned out of communication with the interior of the can to discharge its contents to a place of consumption, the air being excluded from the container during said dispensing operation.

2. A dispensing cover or lid having a flanged portion to be telescoped around a can or receptacle containing granulated or powdered material to be dispensed, a truncated oblique pyramidal or conical portion extending and converging upwardly from said flanged portion toward one side of the can or receptacle, and a manual metering and dispensing device connected with the apexial portion of the truncated portion, said metering and dispensing device comprising a spherical shell and a spherical rotatable dispenser consisting of a calibrated container which may be turned first to receive a charge from the can or receptacle and then to discharge said charge into a spoon or to other place of consumption, the air being excluded from the container during said dispensing operation.

3. In combination with a container for coffee or granulated or divided material, a dispensing cover or lid having a skirt or collar portion provided with means enabling attachment to the container, an oblique upwardly and sidewardly converging frustro-pyramidal or frustro-conical section, a hemispherical shell connected to the upper end of said frustro section, another hemispherical shell attached to said first-mentioned shell to form an enclosure and an inner rotatable spherical shell closely conforming to the interior of said hemispherical shells and serving as means to discharge measured quantities of said material without substantially admitting the atmosphere.

4. In combination with a container for coffee or granulated or divided material, a dispensing cover or lid having a skirt or collar portion provided with means enabling attachment to the container, an oblique upwardly and sidewardly converging frustro-pyramidal or frustro-conical section, a hemispherical shell connected to the upper of said frustro sections, another hemispherical shell attached to said first-mentioned shell to form an enclosure and an inner rotatable spherical shell closely conforming to the interior of said hemispherical shells and serving as means to discharge measured quantities of said material, without substantially admitting the atmosphere, said inner shell being provided with a key, the stem of which projects through the outer hemispherical shells and forms a bearing and pivot mount for said outer shells.

5. In combination with a container for coffee or granulated or divided material, a dispensing cover or lid having a skirt or collar portion provided with means enabling attachment to the container, an oblique upwardly and sidewardly converging frustro-pyramidal or frustro-conical section, a hemispherical shell connected to the upper part of said frustro section, another hemispherical shell attached to said first-mentioned shell to form an enclosure and an inner rotatable spherical shell closely conforming to the interior of said hemispherical shells and serving as means to discharge measured quantities of said material, said inner shell being provided with a key, the stem of which projects through the outer hemispherical shell and forms a bearing and pivot mount on said outer shells, and a projection on the exterior of said outer shells limiting the movement of said inner shell.

6. A spherical dispenser including an outer two-piece spherical shell and an inner conforming spherical shell, the opposite sides of said outer shell being provided with charging and discharging openings and the inner shell being provided with a single opening adapted alternately to be turned into registration with said first-mentioned openings.

CARLOS J. ROHDE.
MARIO T. MENIER.